US010301512B2

(12) United States Patent
Klich et al.

(10) Patent No.: US 10,301,512 B2
(45) Date of Patent: May 28, 2019

(54) WRAPPING FILMS WITH INCREASED OPACITY

(71) Applicant: Avery Dennison Corporation, Glendale, CA (US)

(72) Inventors: Paul R. Klich, Lyndhurst, OH (US); Connie Howe, Springboro, OH (US)

(73) Assignee: Avery Dennison Corporation, Glendale, CA (US)

(*) Notice: Subject to any disclaimer, the term of this patent is extended or adjusted under 35 U.S.C. 154(b) by 361 days.

(21) Appl. No.: 14/969,818

(22) Filed: Dec. 15, 2015

(65) Prior Publication Data
US 2016/0186020 A1 Jun. 30, 2016

Related U.S. Application Data

(60) Provisional application No. 62/097,944, filed on Dec. 30, 2014.

(51) Int. Cl.
B32B 27/30 (2006.01)
C09J 133/00 (2006.01)
B32B 27/08 (2006.01)
B44C 1/10 (2006.01)
C09J 7/38 (2018.01)

(52) U.S. Cl.
CPC ............ C09J 133/00 (2013.01); B32B 27/08 (2013.01); B32B 27/30 (2013.01); B44C 1/105 (2013.01); C09J 7/385 (2018.01); B32B 2255/10 (2013.01); B32B 2255/26 (2013.01); B32B 2307/402 (2013.01); B32B 2307/41 (2013.01); B32B 2405/00 (2013.01); B32B 2451/00 (2013.01); B32B 2605/00 (2013.01)

(58) Field of Classification Search
CPC ............ B32B 2255/10; B32B 2255/26; B32B 2307/402; B32B 2307/41; B32B 2405/00; B32B 2451/00; B32B 2605/00; B32B 27/08; B32B 27/30; B44C 1/105; C09J 133/00; C09J 7/0217
See application file for complete search history.

(56) References Cited

U.S. PATENT DOCUMENTS

| | | | |
|---|---|---|---|
| 5,160,778 A | 11/1992 | Hashimoto et al. | |
| 5,518,786 A | 5/1996 | Johnson et al. | |
| 6,042,678 A * | 3/2000 | Johnson ................. | B05D 1/286 156/230 |
| 6,096,396 A | 8/2000 | Patton et al. | |
| 6,106,982 A | 8/2000 | Mientus et al. | |
| 6,171,681 B1 | 1/2001 | Mascarenhas et al. | |
| 6,336,988 B1 | 1/2002 | Enlow et al. | |
| 6,440,530 B1 | 8/2002 | Jud | |
| 6,521,337 B2 | 2/2003 | Yanagiuchi | |
| 6,547,912 B2 | 4/2003 | Enlow et al. | |
| 6,630,049 B2 | 10/2003 | Hannington et al. | |
| 6,673,419 B1 | 1/2004 | Mori | |
| 6,733,870 B2 | 5/2004 | Enlow et al. | |
| 7,060,351 B2 | 6/2006 | Hannington | |
| 7,141,294 B2 | 11/2006 | Sakurai et al. | |
| 7,320,824 B2 | 1/2008 | Ohgane et al. | |
| 7,427,430 B2 | 9/2008 | Rhee et al. | |
| 8,367,176 B1 | 2/2013 | Biancella et al. | |
| 2002/0110694 A1 | 8/2002 | Falaas et al. | |
| 2002/0114951 A1 | 8/2002 | Horansky | |
| 2003/0026932 A1* | 2/2003 | Johnson ................. | B32B 15/08 428/40.1 |
| 2004/0096630 A1 | 5/2004 | Sakurai et al. | |
| 2004/0258905 A1 | 12/2004 | Hase et al. | |
| 2005/0196607 A1 | 9/2005 | Shih et al. | |
| 2007/0116903 A1 | 5/2007 | Song et al. | |
| 2008/0078498 A1* | 4/2008 | Zeik ....................... | B32B 27/30 156/277 |
| 2008/0311369 A1 | 12/2008 | Yokoyama et al. | |
| 2012/0328818 A1 | 12/2012 | Dronzek, Jr. | |
| 2013/0153137 A1 | 6/2013 | Loescher et al. | |

FOREIGN PATENT DOCUMENTS

| | | |
|---|---|---|
| CN | 1551838 | 12/2004 |
| CN | 201457955 | 5/2010 |
| CN | 201833812 | 5/2011 |
| CN | 1814508 | 6/2011 |
| CN | 1814507 | 7/2011 |
| CN | 1814509 | 7/2011 |
| CN | 101708788 | 8/2011 |
| CN | 202046559 | 11/2011 |
| CN | 202784257 | 3/2013 |
| CN | 202784258 | 3/2013 |
| CN | 202924089 | 5/2013 |
| CN | 102285174 | 6/2014 |
| EP | 2604444 | 6/2013 |
| JP | 63-77570 | 4/1988 |
| JP | 08-505575 | 6/1996 |
| JP | 2003-118061 | 4/2003 |
| JP | 2003-118062 | 4/2003 |
| JP | 2003-118064 | 4/2003 |

(Continued)

OTHER PUBLICATIONS

International Search Report and Written Opinion dated Apr. 1, 2016 issued in corresponding IA No. PCT/US2015/065796 filed Dec. 15, 2015.

(Continued)

Primary Examiner — Lawrence D Ferguson
(74) Attorney, Agent, or Firm — Avery Dennison Corporation

(57) ABSTRACT

Multilayer graphic films having high opacity are described. The films may exhibit long term removability. In certain versions, the films are well suited for use as vehicle wrapping films. Also described are methods of using the films and methods for manufacturing the films.

18 Claims, 1 Drawing Sheet

(56) References Cited

FOREIGN PATENT DOCUMENTS

| | | |
|---|---|---|
| JP | 2003-124254 | 4/2003 |
| JP | 2003-291278 | 10/2003 |
| JP | 2004226478 | 8/2004 |
| JP | 2010-184361 | 8/2010 |
| WO | 94/09983 | 5/1994 |
| WO | 97/22474 | 6/1997 |
| WO | 03/020529 | 3/2003 |
| WO | 2008/042397 | 4/2008 |
| WO | 2008/138012 | 11/2008 |

OTHER PUBLICATIONS

International Preliminary Report on Patentability dated Jul. 13, 2017 issued in corresponding IA No. PCT/US2015/065796 filed Dec. 15, 2015.

* cited by examiner

WRAPPING FILMS WITH INCREASED OPACITY

CROSS-REFERENCE TO RELATED APPLICATION

The present application claims the benefit of U.S. Provisional Patent Application No. 62/097,944 filed on Dec. 30, 2014, which is incorporated herein by reference in its entirety.

FIELD

The present subject matter relates to wrapping films having increased opacity, and methods of forming and using the improved wrapping films.

BACKGROUND

Vehicle wraps are a well known means of decorating and/or placing advertising on vehicles such as vans, cars, trucks, trailers, buses, recreational vehicles, etc. (collectively, "vehicles" hereinafter). In brief, a vehicle wrap is a plastic sheet typically vinyl or other conformable material upon which a graphical image has been printed. The wrap is preferably removably affixed (e.g., via adhesive) to the exterior of a vehicle, thereby suggesting that the vehicle has been custom painted. One advantage of a vehicle wrap is that the wrap can be removed, if somewhat laboriously, and the design changed unlike a painted solution.

Although satisfactory in many regards, a need remains for wrapping films that can be easily removed, even after long time periods.

Appearance of a wrapping film and particularly that of any graphical images on the film is typically an important factor. Highly opaque films typically exhibit attractive appearance and improved aesthetic qualities particularly with regard to colors or graphic images on the film. However, conventional techniques for increasing opacity in films typically lead to increased costs, increased thickness of the film, and/or require greater manufacturing complexity.

Accordingly, a need remains for wrapping films that exhibit relatively high opacity without the attendant problems as noted.

SUMMARY

The difficulties and drawbacks associated with previous approaches are addressed in the present subject matter as follows.

In one aspect, the present subject matter provides a multilayer film comprising a clear adhesive layer, a tie coat layer, a white layer, a color layer, and a clear layer. The tie coat layer is disposed immediately adjacent to and between the clear adhesive layer and the white layer.

In another aspect, the present subject matter provides a multilayer film comprising a clear adhesive layer, a tie coat layer, a color layer, and a clear layer. The tie coat layer is disposed immediately adjacent to and between the clear adhesive layer and the color layer.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
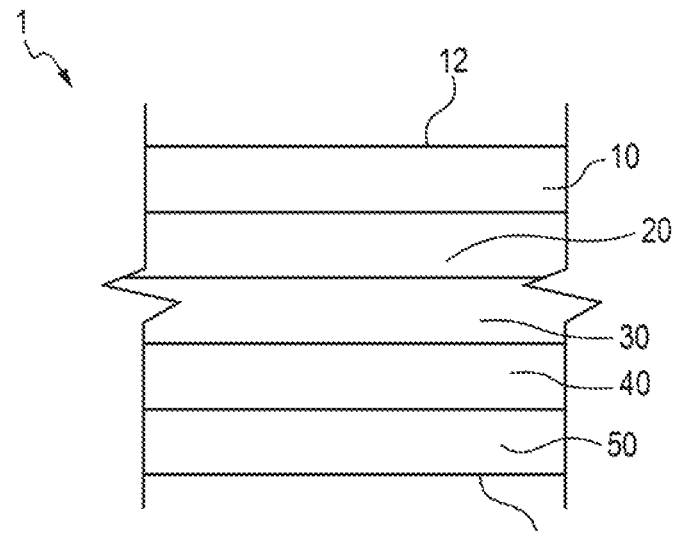
FIG. 1 is a schematic cross sectional view of an embodiment of a multilayer film in accordance with the present subject matter.

The present subject matter provides various multilayer films that are particularly adapted for use as wrapping films such as for use on vehicles. The multilayer films of the present subject matter exhibit relatively high levels of opacity. In particular versions of the multilayer films, the films exhibit long term removability (LTR) such that after relatively long time periods of affixment to a vehicle surface, for example up to 3 months, and more particularly 1 year or longer, and exposure to typical environmental factors, the films can be readily removed from the vehicle surface without damage to the surface. In one embodiment, a multilayer film is provided which comprises (i) a clear adhesive layer, (ii) a tie coat layer, (iii) a white layer, (iv) a color layer, and (v) a clear layer. In another embodiment, a multilayer film is provided which comprises (i) a clear adhesive layer, (ii) a tie coat layer, (iii) a color layer, and (iv) a clear layer. Each of these embodiments, their layers, their constructions, and additional details of the present subject matter are all described in greater detail herein.

Certain versions of the multilayer films of the present subject matter exhibit relatively high opacity levels. The term "relatively high opacity" refers to an opacity greater than 80%, more particularly greater than 85%, more particularly greater than 90%, in certain embodiments greater than 95%, in particular embodiments greater than 98%, and in still other embodiments greater than 99%. Opacity and its measurement are described in ASTM D1746. Many of the layers in the multilayer films are described as "clear." That term as used herein refers to the layer being optically clear or substantially clear so as to exhibit a transparency of at least about 85%, in many embodiments at least 90%, and in certain versions at least 92%. Transparency and its measurement are described in ASTM D1746.

As will be appreciated, the clear adhesive layer is typically the layer of the multilayer film(s) which contacts a receiving surface such as a vehicle surface upon application of the film. Although the present subject matter includes a variety of layer sequences, arrangements, or "orders", certain relationships are present in many of the embodiments of the subject matter. For example, the tie coat layer is typically between any adhesive layer and either a white or color layer, and in certain versions is immediately adjacent to those layers. And in films that include a color layer and a white layer, typically those layers are immediately adjacent to each other. These arrangements and other aspects of the multilayer films have been discovered to lead to significantly higher opacity levels as compared to other corresponding films.

Clear Adhesive Layer(s)

A wide array of adhesives can be used for this layer. In many versions of the present subject matter, the adhesive is a clear, acrylic, permanent adhesive. An example of such as adhesive which is commercially available is FASSON S-4000 available from Avery Dennison.

In many versions of the present subject matter, upon incorporation in the multilayer films, the adhesive layer exhibits long term removability (LTR). As noted, this characteristic refers to the film being removable from a vehicle surface to which the film was previously applied for a time period of at least three (3) months. The present subject matter also includes films that do not exhibit this LTR characteristic. If the LTR characteristic is not necessary for the subject film, other adhesives can be used. Nonlimiting examples of such other adhesives include FASSON S-652, S-6700, S-659, and S-8072. In particular versions of the present subject matter, if the LTR characteristic is not necessary for the subject film, a wide array of solvent and nonsolvent acrylic adhesives could potentially be used.

The adhesive layer can have a thickness of from about 0.2 mil to about 2.0 mil, more particularly from about 1.25 mil to about 1.6 mil, and in many embodiments a thickness of about 1.4 mil.

Tie Coat Layer(s)

A variety of tie coat materials can be used. In many versions of the present subject matter, the tie coat material is pigmented, and may be pigmented to exhibit particular colors such as gray or white. The present subject matter includes the use of pigments to produce other colors. An example of a gray tie coat material which can be used and which is commercially available is APV A-8892 available from APV Engineered Coatings. An example of a white tie coat material which can be used and which is commercially available is APV A-1060 available from APV Engineered Coatings.

The tie coat layer can have a thickness of from about 0.1 mil to about 1.4 mil, and more particularly from about 0.2 mil to about 1.0 mil. In certain embodiments, the tie coat thickness is from about 0.16 mil to about 0.26 mil and more particularly about 0.2 mil. And in other particular embodiments, the tie coat thickness is from about 0.75 mil to about 0.95 mil, and more particularly about 0.8 mil.

In applying a liquid tie coat material onto an immediately adjacent white or color layer, the tie coat can be applied at a coat weight in a range of from about 3 gsm to about 30 gsm, particularly 5 gsm to 21 gsm, and in certain embodiments 5 gsm or 21 gsm.

Additional details as to the tie coat layer(s) and their processing are provided in U.S. Pat. Nos. 6,042,678; 6,630,049; 7,060,351; 6,336,988; 6,547,912; and 6,106,982.

White Layer(s)

The white layer comprises a flexible synthetic resinous coating composition containing a sufficient amount of uniformly dispersed pigment to provide a white color in the overall appearance of the multilayer film. The resinous material contained in the white layer functions in combination with other layer(s) in the film to produce the required exterior film surface characteristics. The white layer(s) used in the multilayer films are typically white vinyl materials.

The thickness of the white layer is typically from about 1.0 mil to about 2 mil, particularly from about 1.2 mil to about 1.8 mil, more particularly from about 1.4 mil to about 1.6 mil, and in certain embodiments about 1.5 mil.

Additional details as to the white layer(s) and their processing are provided in U.S. Pat. Nos. 6,042,678; 6,630,049; 7,060,351; 6,733,870; 6,547,912; and 6,171,681.

Color Layer(s)

The color layer comprises a flexible synthetic resinous coating composition containing a sufficient amount of uniformly dispersed pigment to provide the appearance necessary for exterior vehicle use. The resinous material contained in the color layer functions in combination with other layer(s) in the multilayer films to produce the required exterior film surface characteristics. The color layer(s) used in the multilayer films are typically colored vinyl materials.

The color layer and/or the previously noted white layer may contain a substantial pigment level in order to provide sufficient opacity to maintain desirable coloration. For most colors, a pigment level from about 2% to about 30%, by weight of the solids contained in the layer produces the desired opacity in the finished film. The amount of pigment used varies depending upon the color. For a white color coat used over a vehicle body panel, for example, a pigment level of about 30%, by weight of the total solids, can be used. For a black color coat using carbon black pigment applied over a vehicle body panel, about 2% pigment can be used, for example.

The pigment contained in the color layer and/or the white layer can affect exterior vehicle properties. For instance, different pigments, even of the same color, can vary widely with respect to their resistance to weathering, particularly UV weatherability. The pigments dispersed in the color layer and/or the white layer may retain plasticizer(s) and, thereby, may prevent plasticizer migration which can cause intercoat adhesion and volatile haze problems. A high pigment level in the color layer and/or the white layer also can affect mechanical properties of the coating, such as durability and elongation.

Thus, the desired color layer and/or the white layer formulation provides the appearance and durability properties which, in combination with other layer(s) such as the clear layer, produce a multilayer film having the properties suitable for exterior vehicle use.

The thickness of the color layer is typically from about 1.0 mil to about 2.5 mil, more particularly from about 1.2 mil to about 2.2 mil, and in certain embodiments from about 1.4 mil to about 1.6 mil and more particularly about 1.5 mil, and in other embodiments from about 1.8 mil to about 2.2 mil and more particularly about 2.0 mil.

Additional details as to the color layer(s) and their processing are provided in U.S. Pat. Nos. 6,042,678; 6,630,049; 7,060,351; 6,733,870; 6,547,912; and 6,171,681

Clear Layer(s)

The clear layer is a transparent or substantially transparent thermoplastic synthetic resinous coating composition coated in thin film form. The clear layer typically constitutes an outermost layer or surface of the film after application to a surface of interest such as a vehicle surface. The clear layer(s) used in the multilayer films are generally clear vinyl materials. The resinous material contained in the clear layer functions in combination with other layer(s) in the film to produce the required exterior film surface characteristics.

The thickness of the clear layer can be from about 0.2 mil to about 1.5 mil, more particularly from about 1.0 mil to about 1.4 mil, more particularly about 1.1 mil to about 1.3 mil, and in certain embodiments about 1.2 mil.

Additional details as to the clear layer(s) and their processing are provided in U.S. Pat. Nos. 6,296,732; 6,773,804; 6,042,678; 6,630,049; and 7,060,351.

Additional Layer(s)

The multilayer films of the present subject matter can also include one or more layers in addition to various combinations of the noted layers. Nonlimiting examples of additional layers include top or topcoat layers, which would typically be clear. Multiple color layers could also be used. One or more supplemental opacifying layers could also be incorporated in the multilayer films. In addition, one or more release layers can be included such as layers of silicone and particularly polydimethylsiloxane release agents known in the art. Liner layers, liner assemblies, and carrier films or agents can also be incorporated in the multilayer films of the present subject matter.

The multilayer films can have a total thickness of from about 3 mil to about 8 mil, more particularly from about 4 mil to about 7 mil, and in certain versions from about 5 mil to about 6 mil. The present subject matter includes multilayer films as described herein having a total thickness of less than 3 mil, and a total thickness greater than 8 mil.

FIG. 1 is a schematic cross sectional view of an embodiment of a multilayer film 1 in accordance with the present subject matter. The multilayer film 1 comprises a clear adhesive layer 10, a tie coat layer 20 which for example can be gray, a white layer 30, a color layer 40, and a clear layer 50. The tie coat layer 20 is disposed immediately adjacent to and between the clear adhesive layer 10 and the white layer 30. The white layer 30 is immediately adjacent to the color layer 40. The color layer 40 is immediately adjacent to the clear layer 50. The multilayer film 1 defines an adhesive face 12 for application to a surface such as a vehicle surface, and an oppositely directed top or outer face 52.

Figure 2:
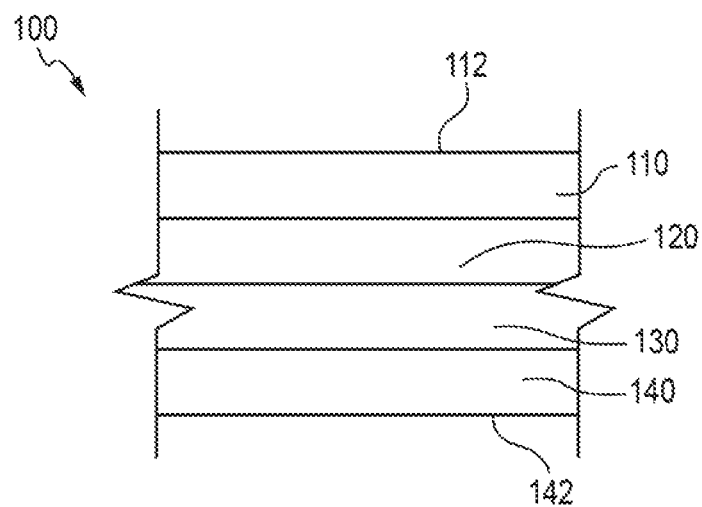
FIG. 2 is a schematic cross sectional view of another embodiment of a multilayer film in accordance with the present subject matter.

FIG. 2 is a schematic cross sectional view of another embodiment of a multilayer film 100 in accordance with the present subject matter. The multilayer film 100 comprises a clear adhesive layer 110, a tie coat layer 120 which can for example be white, a color layer 130, and a clear layer 140. The tie coat layer 120 is disposed immediately adjacent to and between the clear adhesive layer 110 and the color layer 130. The multilayer film 100 defines an adhesive face 112 for application to a surface such as a vehicle surface, and an oppositely directed top or outer face 142.

Methods

The various multilayer films of the present subject matter can be formed using a wide array of techniques and operations. In many methods, a white or colored polymeric film layer such as the previously described white vinyl layer or the color vinyl layer is face coated on one side with a tie coat layer. After sufficient drying of the tie coat layer, the clear adhesive layer is deposited on the tie coat layer. The clear adhesive layer and/or the tie coat layer(s) may be subjected to additional processing such as one or more drying and/or curing operations.

In certain embodiments such as those utilizing a single white or color vinyl layer, the other face of the vinyl layer (i.e., oppositely directed from the tie coat layer) can receive and/or be positioned immediately adjacent to the clear layer.

In embodiments that include additional layers such as a color vinyl layer or a second vinyl layer, that layer is typically positioned between (i) a white vinyl layer or a first vinyl layer and (ii) the clear layer which is disposed on the outermost layer of the multilayer film opposite the clear adhesive layer. These additional layers can be joined or otherwise incorporated with the assembly of films containing the clear adhesive layer by techniques known in the art.

The multilayer films can be used, e.g., applied to a vehicle surface as follows. For vehicle preparation, all areas of the vehicle body panel are thoroughly washed to remove any protective coatings.

The cleaning procedure typically involves using a clean, lint-free cloth to wipe the areas with an optional cleaner. Then, using a clean, lint-free cloth, the entire area is dry-wiped. The film should be applied as soon as reasonably possible after the dry-wipe step to avoid additional contamination.

Temperature effects can have a profound effect on application properties. Film application is most easily made when air, film and body surface temperatures are between 21° C. and 32° C. For applications below 21° C., heat lamps or other suitable means are used to warm the body surface and film. The body surface should be allowed to cool if above 32° C. The film should not be applied when the film and surface temperature are below 15° C.

Tools and equipment include plastic squeegee (both with and without a felt oversleeve), spray bottle, air release tool or pin, razor blades, heat gun, clean, lint-free cloths, heaters, and detergent or surfactant.

Since contamination can be visible in the film application, the working area should be draft free and free from dust or dirt. Lighting should be bright enough to clearly reveal all vehicle contour lines without shadowing, especially in the lower body area. Heat lamps should be available when lower temperatures are expected.

The first step in the application procedure is removal of the liner (if a liner is present) covering the adhesive layer. During the liner removal step, the film is placed on a clean, flat surface with the liner side up. The liner is removed in a smooth, 180° motion. It is mandatory to remove the liner from the film, and not vice versa, since removing the film from the liner can cause film stretching.

The film is next aligned to the proper location on the vehicle body panel. Starting in the center and working outward, a squeegee is used to pressurize the film to the surface with firm, overlapping strokes, making sure accurate alignment is maintained. Squeegeeing is repeated until all air is removed from beneath the film and proper edge bonding is ensured.

The applied film is inspected for air bubbles which can be pierced with an air release tool or pin. The squeegee is used to force air out through the pierced hole. If trimming the film is necessary, a sharp razor blade with a back-up template are used to prevent damage to any painted areas. The entire surface of the film is examined for manufacturing flaws, wrinkles, or misalignment. The entire surface of the film is resqueegeed, using the squeegee with a felt oversleeve, to ensure that all edges have received adequate pressure to prevent tape peeling.

Tables 1 and 2 illustrate two particular embodiments of multilayer films in accordance with the present subject matter.

TABLE 1

Multilayer Film, Embodiment A

| Layer | Thickness (mil) |
|---|---|
| Clear Adhesive Layer | 1.4 |
| Gray Tie Coat Layer | 0.2 |
| White Vinyl Layer | 1.5 |
| Color Vinyl | 1.5 |
| Clear Vinyl Layer | 1.2 |

TABLE 2

Multilayer Film, Embodiment B

| Layer | Thickness (mil) |
|---|---|
| Clear Adhesive Layer | 1.4 |
| White Tie Coat Layer | 0.8 |
| Color Vinyl Layer | 2.0 |
| Clear Vinyl Layer | 1.2 |

EXAMPLES

In order to evaluate several multilayer films of the present subject matter, opacity measurements were taken and compared to opacity measurements of various vehicle wrapping films commercially available under the designation SW 900 Supreme Wrapping Film from Avery Dennison. Table 3 set forth below summarizes the results of this testing.

Multilayer films of the present subject matter were prepared and designated as follows.

"WVL and HHGTC" multilayer films utilize a construction such as the film 1 depicted in FIG. 1 including a white vinyl layer and a gray tie coat and as described herein. The gray tie coat was applied at a coating weight of 5 gsm.

"HHWTC" multilayer films utilize a construction such as the film 100 shown in FIG. 2 and as described herein and using a white tie coat at a coating weight of 21 gsm.

"HHGTC" multilayer films utilize a construction such as the film 100 shown in FIG. 2 and as described herein and using a gray tie coat at a coating weight of 5 gsm.

Each of the various film samples, e.g., "WVL and HHGTC", "HHWTC", and "HHGTC" included a color layer corresponding to the same color of the noted SW900 film set forth in Table 3 to which the comparison was made.

TABLE 3

Summary of Opacity Measurements and Comparison to SW900 Films

| Product | Opacity (%) | Opacity (%) WVL & HHGTC | Opacity (%) HHWTC | Opacity (%) HHGTC |
|---|---|---|---|---|
| SW900-101-S White Pearlescent | 86.11 | 99.00 | 90.21 | — |
| SW900-225-O Yellow | 85.53 | 99.97 | 88.51 | — |
| SW900-234-O Ambulance Yellow | 96.40 | — | 97.18 | — |
| SW900-370-O Orange | 94.07 | 100.00 | 96.26 | — |
| SW900-327-S Orange Pearlescent | 95.36 | — | 96.09 | — |
| SW900-415-O Red | 96.36 | 99.78 | 98.17 | — |
| SW900-245-O Dark Yellow | 81.91 | 99.90 | 95.36 | — |
| SW900-440-M Cherry Red Metallic | 80.55 | 99.71 | 98.98 | — |
| SW900-427-O Soft Red | 96.26 | — | 99.77 | — |
| SW900-433-O Cardinal Red | 98.30 | — | 98.60 | — |
| SW900-436-O Carmine Red | 96.41 | — | 98.36 | — |
| SW900-731-O Lime Green | 96.44 | 100.00 | 100.00 | — |
| SW900-758-O Grass Green | 99.79 | — | 99.91 | — |
| SW900-777-S Light Green Pearlescent | 97.76 | — | 98.29 | — |
| SW900-814-M Quick Silver Metallic | 93.40 | — | 99.85 | — |
| SW900-101-O White | 93.34 | — | 95.54 | 99.06 |
| SW900-102-O Matte White | 93.80 | 100.00 | 96.00 | 99.23 |
| SW900-475-O Burgundy | 92.41 | — | 94.50 | 99.62 |

As evident in the comparison of opacity measurements set forth in Table 3, the films of the present subject matter exhibit significantly higher levels of opacity.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A multilayer film comprising:
   a clear adhesive layer;
   a tie coat layer;
   a white layer;
   a color layer; and
   a clear layer;
   wherein the tie coat layer is disposed immediately adjacent to and between the clear adhesive layer and the white layer.

2. The multilayer film of claim 1 wherein the white layer is immediately adjacent to the color layer.

3. The multilayer film of claim 1 wherein the color layer is immediately adjacent to the clear layer.

4. The multilayer film of claim 1 wherein the tie coat layer is gray.

5. The multilayer film of claim 1 wherein the clear adhesive layer has a thickness in a range of from 0.2 mil to 2.0 mil.

6. The multilayer film of claim 1 wherein the tie coat layer has a thickness in a range of from 0.1 mil to 1.4 mil.

7. The multilayer film of claim 1 wherein the white layer has a thickness in a range of from 1.0 mil to 2.0 mil.

8. The multilayer film of claim 1 wherein the color layer has a thickness in a range of from 1.0 mil to 2.5 mil.

9. The multilayer film of claim 1 wherein the clear layer has a thickness in a range of from 0.2 mil to 1.5 mil.

10. The multilayer film of claim 1 wherein the tie coat layer is gray, the thickness of the clear adhesive layer is about 1.4 mil, the thickness of the gray tie coat layer is about 0.2 mil, the thickness of the white vinyl layer is about 1.5 mil, the thickness of the color layer is about 1.5 mil, and the thickness of the clear vinyl layer is about 1.2 mil.

11. A multilayer film comprising:
    a clear adhesive layer;
    a tie coat layer;
    a color layer; and
    a clear layer;
    wherein the tie coat layer is disposed immediately adjacent to and between the clear adhesive layer and the color layer.

12. The multilayer film of claim 11 wherein the tie coat layer is white.

13. The multilayer film of claim 11 wherein the clear adhesive layer has a thickness in a range of from 0.2 mil to 2.0 mil.

14. The multilayer film of claim 11 wherein the tie coat layer has a thickness in a range of from 0.1 mil to 1.4 mil.

15. The multilayer film of claim 11 wherein the color layer has a thickness in a range of from 1.0 mil to 2.5 mil.

16. The multilayer film of claim 11 wherein the clear layer has a thickness in a range of from 0.2 mil to 1.5 mil.

17. The multilayer film of claim 11 wherein the color layer is immediately adjacent to the clear layer.

18. The multilayer film of claim 11 wherein the tie coat layer is white and the thickness of the clear adhesive layer is about 1.4 mil, the thickness of the white tie coat layer is about 0.8 mil, the thickness of the color vinyl layer is about 2.0 mil, the thickness of the clear layer is about 1.2 mil.

\* \* \* \* \*